United States Patent [19]

Munk et al.

[11] Patent Number: 5,149,767
[45] Date of Patent: Sep. 22, 1992

[54] THERMOSETTING MIXTURES UTILIZING ARALIPHATIC SULFONIUM SALTS

[75] Inventors: Kurt Munk, Grenzach, Fed. Rep. of Germany; Martin Roth, Giffers, Switzerland

[73] Assignee: Ciba-Geigy Corporation, Ardsley, N.Y.

[21] Appl. No.: 595,918

[22] Filed: Oct. 11, 1990

[30] Foreign Application Priority Data

Oct. 18, 1989 [CH] Switzerland ............... 3788/89

[51] Int. Cl.$^5$ ............... C08F 4/20; C08G 59/68
[52] U.S. Cl. ............... 528/71; 528/73; 528/90; 528/139; 528/143; 528/356; 528/361; 528/364; 528/365; 528/366; 528/393; 528/408; 528/409; 525/327.2; 525/327.3; 526/192; 526/222
[58] Field of Search ............... 528/71, 73, 90, 139, 528/143, 356, 361, 364, 365, 366, 393, 408, 409; 525/327.2, 327.3; 526/192, 222

[56] References Cited

U.S. PATENT DOCUMENTS

| | | | |
|---|---|---|---|
| 3,935,087 | 1/1976 | Jerabek et al. | 204/181 |
| 4,038,232 | 7/1977 | Bosso et al. | 528/73 |
| 4,110,287 | 8/1978 | Bosso et al. | 528/73 |
| 4,390,644 | 1/1983 | Clarke et al. | 521/137 |
| 4,564,651 | 1/1986 | Markert et al. | 528/55 |
| 4,631,306 | 12/1986 | Markert et al. | 528/53 |
| 4,728,676 | 3/1988 | Müller et al. | 528/51 |
| 4,740,539 | 4/1988 | Goel | 528/73 |
| 4,906,722 | 3/1990 | Eldin et al. | 528/73 |
| 5,013,814 | 5/1991 | Roth et al. | 528/90 |

Primary Examiner—John Kight
Assistant Examiner—John M. Cooney, Jr.
Attorney, Agent, or Firm—Luther A. R. Hall

[57] ABSTRACT

Thermosetting mixtures containing
(a) an epoxy resin having on average more than one 1,2-epoxide group in the molecule,
(b) a di- or polyisocyanate compound and
(c) a sulfonium salt of the formulae I to IV

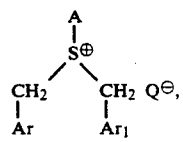

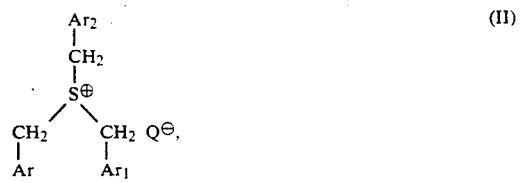

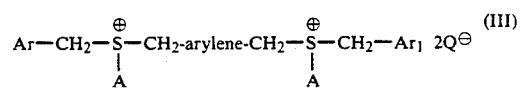

and

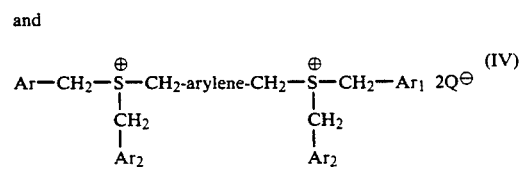

in which A is $C_1$–$C_{12}$alkyl, $C_3$–$C_8$cycloalkyl, $C_4$–$C_{10}$ cycloalkylalkyl or phenyl which is unsubstituted or substituted by one or more substituents from the group comprising $C_1$–$C_8$alkyl, $C_1$–$C_4$alkoxy, halogen, nitro, phenyl, phenoxy, alkoxycarbonyl having 1–4 C atoms in the alkoxy radical or acryl having 1–12 C atoms, Ar, $Ar_1$ and $Ar_2$ indpendently of one another are each phenyl which is unsubstituted or substituted by one or more substituents from the group comprising $C_1$–$C_8$alkyl, $C_1$–$C_4$alkoxy, halogen, nitro, phenyl, phenoxy, alkoxycarbonyl having 1–4 C atoms in the alkoxy radical and acyl having 1–12 C atoms, or are naphthyl which is unsubstituted or substituted by one or more substituents from the group comprising $C_1$–$C_8$alkyl, $C_1$–$C_4$alkoxy, halogen, nitro, phenyl, phenoxy, alkoxycarbonyl having 1–4 C atoms in the alkoxy radical and acyl having 1–12 C atoms, arylene in each case is phenylene which is unsubstituted or substituted by one or more substitutents from the group comprising $C_1$–$C_8$alkyl, $C_1$–$C_4$alkoxy, halogen, nitro, phenyl, phenoxy, alkoxycarbonyl having 1–4 C atoms in the alkoxy radical and acyl having 1–12 C atoms, or is naphthylene which is unsubstituted or substituted by one or more substituents from the group comprising $C_1$–$C_8$alkyl, $C_1$–$C_4$alkoxy, halogen, nitro, phenyl, phenoxy, alkoxycarbonyl having 1–4 C atoms in the alkoxy radical and acyl having 1–12 C atoms, and $Q^\ominus$ is $SbF_6^\ominus$, $AsF_6^\ominus$ or $SbF_5OH^\ominus$, give moulded materials of high crosslinking density and thus high heat resistance on thermal curing.

11 Claims, No Drawings

THERMOSETTING MIXTURES UTILIZING ARALIPHATIC SULFONIUM SALTS

The present invention relates to thermosetting mixtures based on epoxy resins and di- or polyisocyanate compounds which contain certain mono- or disulfonium salts as curing agents, and the products obtained therefrom by thermal curing.

Thermosetting mixtures based on epoxy resins and di- or polyisocyanate compounds are known. In EP Application 130,454 and in DE-OS 3,323,084, for example, tertiary amines or imidazoles, in particular addition complexes of boron trihalides with tertiary amines and imidazoles or onium salts of tertiary amines and imidazoles, are employed as curing agents for such mixtures.

In DE-OS 3,600,764, tertiary or quaternary ammonium salts of alkylating or acid esters of organic phosphonic acids or of phosphoric acid are used for thermosetting mixtures of epoxy resins and polyisocyanate compounds. Certain cyanoacetamides are furthermore employed in EP Application 319,473 for curing mixtures of epoxy resins and polyisocyanate compounds.

The moulded materials produced from these known thermosetting mixtures in general have good mechanical properties, but still leave something to be desired in respect of their heat distortion point. It has now been found that when certain araliphatic mono- or disulfonium salts are used as curing agents for mixtures of epoxy resins and di- or polyisocyanate compounds, moulded materials having a high crosslinking density and thus a high heat distortion point are obtained.

The present invention thus relates to thermosetting mixtures containing
(a) an epoxy resin having on average more than one 1,2-epoxide group in the molecule,
(b) a di- or polyisocyanate compound and
(c) a sulfonium salt of the formulae I to IV

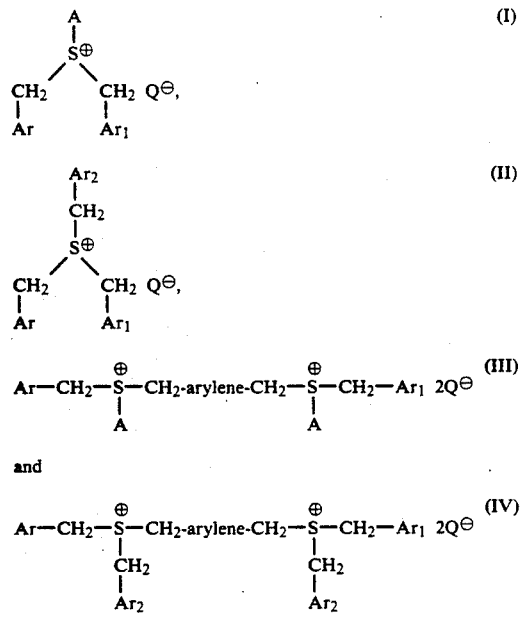

in which A is $C_1$–$C_{12}$alkyl, $C_3$–$C_8$cycloalkyl, $C_4$–$C_{10}$cycloalkylalkyl or phenyl which is unsubstituted or substituted by one or more substituents from the group comprising $C_1$–$C_8$alkyl, $C_1$–$C_4$alkoxy, halogen, nitro, phenyl, phenoxy, alkoxycarbonyl having 1–4 C atoms in the alkoxy radical or acyl having 1–12 C atoms, Ar, $Ar_1$ and $Ar_2$ independently of one another are each phenyl which is unsubstituted or substituted by one or more substituents from the group comprising $C_1$–$C_8$alkyl, $C_1$–$C_4$alkoxy, halogen, nitro, phenyl, phenoxy, alkoxycarbonyl having 1–4 C atoms in the alkoxy radical and acyl having 1–12 C atoms, or are naphthyl which is unsubstituted or substituted by one or more substituents from the group comprising $C_1$–$C_8$alkyl, $C_1$–$C_4$alkoxy, halogen, nitro, phenyl, phenoxy, alkoxycarbonyl having 1–4 C atoms in the alkoxy radical and acyl having 1–12 C atoms, arylene in each case is phenylene which is unsubstituted or substituted by one or more substituents from the group comprising $C_1$–$C_8$alkyl, $C_1$–$C_4$alkoxy, halogen, nitro, phenyl, phenoxy, alkoxycarbonyl having 1–4 C atoms in the alkoxy radical and acyl having 1–12 C atoms, or is naphthylene which is unsubstituted or substituted by one or more substituents from the group comprising $C_1$–$C_8$alkyl, $C_1$–$C_4$alkoxy, halogen, nitro, phenyl, phenoxy, alkoxycarbonyl having 1–4 C atoms in the alkoxy radical and acyl having 1–12 C atoms, and $Q^\ominus$ is $SbF_6^\ominus$, $AsF_6^\ominus$ or $SbF_5OH^\ominus$.

The mixtures according to the invention preferably contain, as the epoxy resin (a), di- or polyepoxide compounds, in particular aliphatic, cycloaliphatic or aromatic di- or polyepoxide compounds or mixtures thereof.

All types of epoxy resins, such as, for example, those which contain groups of the formula V

in which either $R_6$ and $R_8$ are each a hydrogen atom, in which case $R_7$ is then a hydrogen atom or a methyl group, or $R_6$ and $R_8$ together are —CH$_2$CH$_2$ or —CH$_2$CH$_2$CH$_2$—, in which case $R_7$ is then a hydrogen atom, bonded directly to oxygen, nitrogen or sulfur atoms are suitable as the epoxy resin (a).

Examples which may be mentioned of such resins are polyglycidyl esters and poly-(β-methylglycidyl) esters, which can be obtained by reaction of a compound containing two or more carboxylic acid groups per molecule with epichlorohydrin, glycerol dichlorohydrin or β-methylepichlorohydrin in the presence of an alkali. Such polyglycidyl esters can be derived from aliphatic polycarboxylic acids, for example oxalic acid, succinic acid, glutaric acid, adipic acid, pimelic acid, suberic acid, azelaic acid, sebacic acid or dimerized or trimerized linoleic acid, from cycloaliphatic polycarboxylic acids, such as tetrahydrophthalic acid, 4-methyltetrahydrophthalic acid, hexahydrophthalic acid and 4-methylhexahydrophthalic acid, and from aromatic polycarboxylic acids, such as phthalic acid, isophthalic acid and terephthalic acid.

Other examples are polyglycidyl ethers and poly-(β-methylglycidyl) ethers which are obtainable by reaction of a compound containing at least two free alcoholic and/or phenolic hydroxyl groups per molecule with the corresponding epichlorohydrin under alkaline conditions, or in the presence of an acid catalyst, with subsequent treatment with an alkali. These ethers can be prepared with poly-(epichlorohydrin) from acyclic alcohols, such as ethylene glycol, diethylene glycol and higher poly-(oxyethylene) glycols, propane-1,2-diol and poly-(oxypropylene) glycols, propane-1,3-diol, butane-1,4-diol, poly-(oxytetramethylene) glycols, pentane-1,5-diol, hexane-1,6-diol, hexane-2,4,6-triol, glycerol, 1,1,1-trimethylolpropane, pentaerythritol and sorbitol, from cycloaliphatic alcohols, such as resorcitol, quinitol, bis-(4-hydroxycyclohexyl)-methane, 2,2-bis-(4-hydroxycyclohexyl)-propane and 1,1-bis-(hydroxymethyl)-cyclohex-3-ene, and from alcohols having aromatic nuclei, such as N,N-bis-(2-hydroxyethyl)-aniline and p,p'-bis-(2-hydroxyethylamino)-diphenylmethane.

They can furthermore be prepared from mononuclear phenols, such as resorcinol and hydroquinone, as well as polynuclear phenols, such as bis-(4-hydroxyphenyl)-methane, 4,4-dihydroxydiphenyl, bis-(4-hydroxyphenyl) sulfone, 1,1,2,2-tetrakis-(4-hydroxyphenyl)-ethane, 2,2-bis-(4-hydroxyphenyl)-propane (otherwise known as bisphenol A) and 2,2-bis-(3,5-dibromo-4-hydroxyphenyl)-propane, as well as novolaks formed from aldehydes, such as formaldehyde, acetaldehyde, chloral and furfurol, with phenols, such as phenol itself and phenol which is substituted on the ring by chlorine atoms or alkyl groups having in each case up to nine carbon atoms, such as 4-chlorophenol, 2-methylphenol and 4-tert-butylphenol.

Poly-(N-glycidyl) compounds include, for example, triglycidyl isocyanurate and N,N'-diglycidyl derivatives of cyclic alkyleneureas, such as ethyleneurea and 1,3-propyleneurea, and hydantoins, such as 5,5-dimethylhydantoin.

Poly-(S-glycidyl) compounds are, for example, the di-S-glycidyl derivatives of dithiols, such as ethane-1,2-dithiol and bis-(4-mercaptomethylphenyl) ether.

Examples of epoxy resins containing groups of the formula V in which $R_6$ and $R_8$ together are a —$CH_2$—$CH_2$— group are bis-(2,3-epoxycyclopentyl) ether, 2,3-epoxycyclopentyl glycidyl ether, 1,2-bis-(2,3-epoxycyclopentyloxy)-ethane and 3,4-epoxycyclohexylmethyl 2',4'-epoxycyclohexanecarboxylate.

Epoxy resins in which the 1,2-epoxide groups are bonded to different types of hetero atoms, for example the N,N,O-triglycidyl derivative of 4-aminophenol, the glycidyl ether/glycidyl ester of salicyclic acid or p-hydroxybenzoic acid, N-glycidyl-N'-(2-glycidyloxypropyl)-5,5-dimethylhydantoin and 2-glycidyloxy-1,3-bis-(5,5-dimethyl-1-glycidyl-3-hydantoinyl)-propane, are also suitable.

Aromatic epoxy resins, such as novolak epoxy resins or diglycidyl ethers of bisphenols, are specifically preferred.

The mixtures according to the invention preferably contain aliphatic, cycloaliphatic or aromatic isocyanates or mixtures thereof as the di- or polyisocyanate compound (b).

Isomer mixtures of 4,4'- and 2,4'-diisocyanatodiphenylmethane, polyol-modified polyisocyanates and mixtures of liquid polyisocyanates with higher molecular weight polyisocyanates or carbodiimide-polyisocyanates are preferably employed.

Other polyisocyanates which can be used are, for example, hexane 1,6-diisocyanate, cyclohexane 1,3-diisocyanate and isomers, 4,4'-diisocyanatodicyclohexylmethane, 3-isocyanatomethyl-2,5,5-trimethylcyclohexyl isocyanate, 1,3-dimethylbenzene ω,ω'-diisocyanate and isomers, 1-methylbenzene 2,4-diisocyanate and isomers, naphthalene 1,4-diisocyanate, diphenyl ether-4,4'-diisocyanate and isomers, diphenyl sulfone-4,4'-diisocyanate and isomers and isocyanates which are trifunctional or more than trifunctional, for example diphenylmethane 3,3',4,4'-tetraisocyanate. Isocyanates which are masked with phenol or cresol in the customary manner can furthermore also be used. Dimers and trimers of the polyfunctional isocyanates mentioned can likewise be employed. Such polyisocyanates have terminal free isocyanates groups and contain one or more uretdione and/or isocyanurate rings. Processes for the preparation of various types of such trimers and uretdiones are described, for example, in U.S. Pat. Nos. 3,494,888, 3,108,100 and 2,977,370.

Preferably, A in the formulae I and III is $C_1$-$C_{12}$alkyl, Ar, $Ar_1$ and $Ar_2$ in the formulae I to IV independently of one another are each phenyl which is unsubstituted or substituted by one or more substituents from the group comprising $C_1$-$C_8$alkyl, $C_1$-$C_4$alkoxy, Cl and Br and $Q^\ominus$ is $SbF_6^\ominus$ or $SbF_5OH^\ominus$, for example dibenzylethylsulfonium hexafluoroantimonate.

The mixtures according to the invention preferably contain a sulfonium salt of the formula I or II with the preferred meaning of A, Ar, $Ar_1$, $Ar_2$ and $Q^\ominus$ as component (c).

Particularly preferred sulfonium salts are those of the formula II in which Ar, $Ar_1$ and $Ar_2$ independently of one another are each phenyl which is unsubstituted or substituted by $C_1$-$C_8$alkyl, $C_1$-$C_4$alkoxy, Cl or Br and $Q^\ominus$ is $SbF_6^\ominus$ or $SbF_5OH^\ominus$, such as, in particular, tribenzylsulfonium hexafluoroantimonate or tris-(p-methylbenzyl)-sulfonium hexafluoroantimonate.

$C_1$-$C_{12}$Alkyl A in formula I and III can be straight-chain or branched. A can be, for example, methyl, ethyl, isopropyl, n-butyl, sec-butyl, tert-butyl, n-octyl or n-dodecyl.

Examples of suitable cycloalkyl are cyclopropyl, cyclopentyl, cyclohexyl and cyclooctyl.

Examples of cycloalkylalkyl are cyclohexylmethyl and cyclohexylethyl.

Substituted phenyl or naphthyl A, Ar, $Ar_1$ and $Ar_2$ in the formulae I to IV can be phenyl or naphthyl substituted by identical or different substituents. Examples of these are p-tolyl, xylyl, ethylphenyl, methoxyphenyl, ethoxyphenyl, p-chlorophenyl, 2,4-, 3,4- or 2,6-dichlorophenyl, bromophenyl, acetylphenyl, trimethylphenyl, methylnaphthyl, methoxynaphthyl, ethoxynaphthyl, chloronaphthyl, bromonaphthyl and biphenyl.

Substituted phenylene or naphthylene as arylene in the formulae III and IV can be, for example, methylphenylene, ethylphenylene, methoxyphenylene, ethoxyphenylene, chlorophenylene, dichlorophenylene, bromophenylene, acetylphenylene, trimethylphenylene, methylnaphthylene, methoxynaphthylene, ethoxynaphthylene, chloronaphthylene or bromonaphthylene. Arylene is preferably unsubstituted phenylene or naphthylene.

The sulfonium salts of the formulae I and II contained in the mixtures according to the invention can be prepared by one of the processes disclosed in Houben-Weyl, Methoden der organischen Chemie (Methods of Organic Chemistry), volume IX, pages 171 et seq. (1955), and supplement E 11, pages 405 et seq. (1985), for example by reacting a sulfide of the formula VI $$Ar-CH_2-S-CH_2-Ar_1 \qquad (VI),$$

in which Ar and Ar₁ are as defined for formula I or II, either (a) with molar amounts of an oxonium salt of the formula VII

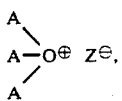     (VII)

in which A is as defined for formula I and $Z^\ominus$ is $Q^\ominus$, $SbCl_6^\ominus$, $BF_4^\ominus$ or $PF_6^\ominus$, to give compounds of the formula I or of the formula Ia

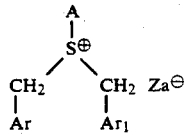     (Ia)

in which $Za^\ominus$ is $SbCl_6^\ominus$, $BF_4^\ominus$ or $PF_6^\ominus$, and then reacting the compounds of the formula Ia with an alkali metal salt or quaternary ammonium salt of the formula VIII $$Y^\oplus Q^\ominus \quad (VIII),$$

in which Y is an alkali metal cation or $N(R_4)^\oplus$, in which R is hydrogen or $C_1$-$C_4$alkyl, and $Q^\ominus$ is as defined for formula I, by anion exchange to give a compound of the formula I, or (b) with at least a molar amount of alcohol of the formula IX $$Ar_2-CH_2-OH \quad (IX),$$

in which $Ar_2$ is as defined for formula II, in the presence of a strong acid to give a sulfonium salt of this acid of the formula IIa

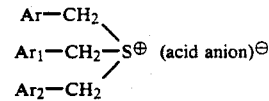     (IIa)

and then reacting the sulfonium salt of the formula IIa with an alkali metal salt or a quaternary ammonium salt of the formula VIII to give a compound of the formula II.

The compounds of the formulae III and IV according to the invention can be prepared in an analogous manner, for example by reacting 1 mol of a compound of the formula X $$Ar-CH_2-S-CH_2\text{-arylene-}CH_2-S-CH_2-Ar_1 \quad (X),$$

in which Ar and Ar₁ are as defined for formula III or IV, either (a) with 2 mol of an oxonium salt of the formula VI to give compounds of the formula III or of the formula IIIa

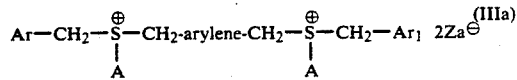     (IIIa)

in which $Za^\ominus$ is $SbCl_6^\ominus$, $BF_4^\ominus$ or $PF_6^\ominus$, and then reacting the compound of the formula IIIa with an alkali metal salt or a quaternary ammonium salt of the formula VIII by anion exchange to give a compound of the formula III, or (b) with 2 mol of an alcohol of the formula VIII in the presence of a strong acid to give a disulfonium salt of this acid of the formula IVa

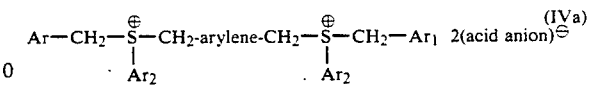     (IVa)

and then reacting the disulfonium salt of the formula IVa with an alkali metal salt or a quaternary ammonium salt of the formula VIII to give a compound of the formula IV.

The compounds of the formulae VI, VII, VIII, IX and X are known compounds, some of which are commercially available.

For example, sulfides of the formula VI are described in Houben-Weyl, volume 9, page 93 (1955), or volume E 11, page 158 (1985), or are commercially available from Fluka and Aldrich.

Oxonium salts of the formula VII are known, for example, from Houben-Weyl, volume 6/3, page 328 (1965), or from U.S. Pat. No. 3,585,227.

Alkali metal salts or quaternary ammonium salts of the formula VIII, for example $NaSbF_6$, $NaAsF_6$ or $NH_6AsF_6$, are commercially available, for example, from Morton Thiokol. Alcohols of the formula IX, for example benzyl alcohol or chlorinated benzyl alcohols, are likewise commercially available.

Compounds of the formula X can be prepared in a known manner, for example by reacting 1 mol of an unsubstituted or substituted α,α'-dihalogenomethylarylene of the formula XI $$Hal-CH_2\text{-arylene-}CH_2-Hal \quad (XI)$$

with 2 mol of an unsubstituted or substituted mercaptan of the formula XII $$Ar-CH_2-SH \text{ or } Ar_1-CH_2-SH \quad (XII)$$

in the presence of alkali metal hydroxide solution, to give compounds of the formula X.

Compounds of the formula I or III in which A is the radical of the formula XIII

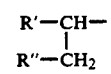     (XIII)

in which R' and R" independently of one another are each a hydrogen atom or, together with the ethylene radical, are alkyl containing up to 12 C atoms or cycloalkyl containing up to 8 C atoms, can furthermore be prepared by reacting a sulfide of the formula VI with at least a molar amount of an olefin of the formula XIV $$R'-CH=CH-R'' \quad (XIV)$$

in the presence of a strong acid to give a sulfonium salt of the formula XV or XVI

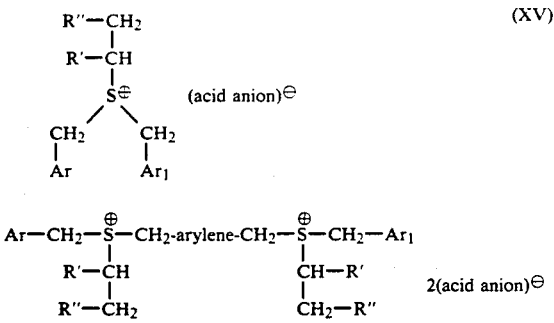

(XV)

$$Ar-CH_2-\overset{\oplus}{S}-CH_2\text{-arylene-}CH_2-\overset{\oplus}{S}-CH_2-Ar_1$$
$$\begin{array}{cc} R'-CH & CH-R' \\ | & | \\ R''-CH_2 & CH_2-R'' \end{array} \quad \text{2(acid anion)}^{\ominus}$$

and then reacting the sulfonium salt of the formula XV or XVI with an alkali metal salt or a quaternary ammonium salt of the formula VIII to give a compound of the formula I or III in which A is the radical of the formula XIII.

Examples of olefins of the formula XIV which are used are ethylene, propylene, but-1-ene, but-2-ene, isobutylene, pent-1-ene, pent-2-ene, cyclobutene, cyclopentene and cyclohexene, and examples of strong acids are $H_2SO_4$, $HPF_6$, $HBF_4$, $HClO_4$ and $CF_3SO_3H$.

The thermosetting mixtures according to the invention preferably contain components (a) and (b) in amounts such that an equivalent ratio of epoxide to isocyanate groups of 0.1 to 5 is present in the mixture. The equivalent ratio of epoxide to isocyanate groups which is particularly preferred in the mixtures according to the invention is 0.3 to 2.5, especially one of 0.4 to 1.

The curing agent (c) is advantageously employed in the mixtures according to the invention in amounts of 0.01 to 10% by weight, preferably 0.1 to 5% by weight and in particular 0.1 to 2.5% by weight, based on the amount of components (a) and (b).

The thermosetting mixtures according to the invention can be obtained in any form, for example as homogeneous liquid mixtures or in a homogeneous or inhomogeneous vitreous form. Homogeneous vitreous products can be obtained in a manner which is known per se, for example by liquefying the solid components (a) and (b), if appropriate with addition of suitable solvents, heating them to temperatures above their glass transition point, adding the curing agent according to formula I or IV and cooling the mixtures formed.

The thermosetting mixtures according to the invention can also contain other known additives usually employed in the art of polymerizable materials. Examples of such additives are pigments, dyes, fillers and reinforcing agents, flame retardant substances, antistatics, adhesion promoters, flow control agents, antioxidants and light stabilizers. Suitable fillers are mineral and fibrous fillers, such as quartz flour, fused quartz, aluminium oxide, glass powder, mica, kaolin, dolomite, graphite, carbon back and carbon fibres and textile fibres. Preferred fillers are quartz flour, fused quartz, aluminium oxide and dolomite.

The thermosetting mixtures according to the invention can be employed quite generally for the production of cured products and can be used in the formulation suitable for the particular specific field of use, for example as coating compositions, paints, pressing compositions, dipping resins, casting resins, impregnating resins, laminating resins, 1- or 2-component adhesives or matrix resins.

Temperatures in the range from 60° to 250° C., preferably 60° to 220° C. and in particular 80° to 200° C., are in general used for curing the mixtures according to the invention.

Precuring at low temperatures until the curable composition gels can also be carried out on the mixtures according to the invention, this then being followed by complete curing at higher temperatures.

The products obtained from the mixtures according to the invention by thermal curing are distinguished above all by a high heat distortion point.

The invention thus furthermore also relates to the products obtained by thermal curing of the mixtures according to the invention, these being solid, insoluble and non-fusible, three-dimensionally crosslinked products. Curing is as a rule carried out with simultaneous shaping to give shaped articles, impregnations, coatings or gluings.

Preparation of the curing agents used:

1. Tris-(p-methylbenzyl)-sulfonium hexafluoroantimonate a) A solution of 269.0 g (1.12 mol) of sodium sulfide hydrate and 12.0 g of tetrabutylammonium hydrogen sulfate (phase transfer catalyst) in 300 ml of water is introduced into a reaction vessel provided with a stirrer and thermometer. 212.6 g (1.52 mol) of 4-methylbenzyl chloride are added dropwise at below 40° C. in the course of 30 minutes (min), while stirring intensively. The reaction mixture is stirred at room temperature (RT) for 4 ½ hours (h) and then at 50°-60° C. for ½ h. The reaction mixture is cooled to 0°-5° C. and kept at this temperature for ½ h. The reaction mixture is filtered and the residue is dissolved in about 2 liters of ethyl acetate. The organic phase is extracted twice by shaking with deionized water (pH ~6) and dried over $MgSO_4$. The ethyl acetate is removed on a rotary evaporator. The residue is dried overnight at RT under a high vacuum. 174.8 g (95% of theory) of di-(p-methylbenzyl) sulfide are obtained as slightly yellowish white crystals having a melting point of 74°-76° C.

Elemental analysis for $C_{16}H_{18}S$: Calculated: (%) C=79.29 H=7.49 S=13.23 Determined: (%) C=79.16 H=7.3 S=13.47.

$^1$H-NMR (100 MHz, $CDCl_3$) in ppm: 2.33 (singlet, 6H); 3.56 (singlet, 4H); 7.15 (singlet, 8H)

b) 85.1 g (0.351 mol) of di-(p-methylbenzyl) sulfide and 51.5 g (0.421 mol) of p-methylbenzyl alcohol are initially introduced into 250 ml of methylene chloride under an $N_2$ atmosphere in a reaction vessel (750 ml) provided with a stirrer and thermometer. 142.7 g of an approximately 54% by weight $HBF_4$ solution in diethyl ether is added dropwise at an internal temperature of 20°-30° C. in the course of 40 min, while stirring. The reaction mixture is stirred at RT for 2 h. The reaction mixture is diluted with methylene chloride and extracted 4 times by shaking with deionized water (pH 5-6). The organic phase is dried with $MgSO_4$ and the methylene chloride is removed on a rotary evaporator. The product, which has not been completely freed from methylene chloride, is stirred in 250 ml of toluene at RT for about 1 h and then at 0°-5° C. for 1 h. The crystals which have now precipitated are filtered off with suction and washed with a little toluene. The product is dried under a high vacuum at room temperature for 19 h. 118.6 g of tris-(p-methylbenzyl)-sulfonium tetrafluoroborate are obtained as white crystals of melting point 168°-170° C.

$^1$H-NMR (100 MHz, d$_6$-acetone) in ppm: 2.33 (singlet, 9H); 4.83 (singlet, 6H); 7.25 (quartet, 12H).

c) A mixture of 100 g (230 mmol) of tris-(p-methylbenzyl)-sulfonium tetrafluoroborate in 500 ml of methylene chloride is dissolved in a 3 liter round-bottomed flask at RT under an N$_2$ atmosphere, and 119.0 g (460 mmol) of sodium hexafluoroantimonate are then added. The mixture is stirred at RT for 3 h and then filtered. The filtrate is freed from the solvent on a rotary evaporator and the viscous oil which remains is left to stand overnight at room temperature. The product which has crystallized is stirred at RT for 2 h, filtered again and sucked dry under a high vacuum.

Recrystallization from isopropanol gives 117.1 g (87% of theory) of tris-(p-methylbenzyl)-sulfonium hexafluoroantimonate as white crystals of melting point 88°–91° C.

Elemental analysis for C$_{16}$H$_{18}$S: Calculated: (%) C=49.49, H=4.67, S=5.5. Determined: (%) C=99.8, H=4.6, S=6.4.

$^1$H-NMR (100 MHz, d$_6$-acetone) in ppm: 2.34 (singlet, 9H); 4.85 (singlet, 6H); 7.25 (quartet, 12H).

2. Tribenzylsulfonium hexafluoroantimonate a) 21.4 g (0.1 mol) of dibenzyl sulfide and 10.8 g (0.1 mol) of benzyl alcohol are initially introduced into 300 ml of acetic acid in a 750 ml reaction vessel provided with a stirrer, thermometer and dropping funnel.

20 ml of concentrated sulfuric acid are added dropwise in the course of 5 minutes (min), while stirring. The reaction mixture is then heated to an internal temperature of 70° C. using an oil bath and is stirred for 2 h. Most of the acetic acid is distilled off and the residue is poured onto 200 ml of water. The suspension is left at 0°–5° for ½ h and filtered and the crystalline residue is dried in vacuo at RT. 36.5 g (91% of theory) of tribenzylsulfonium hydrogen sulfate remain as colourless crystals of melting point 170° C. (decomposition).

b) 16.64 g (0.041 mol) of tribenzylsulfonium hydrogen sulfate are dissolved in 750 ml of hot methanol. 16.04 g (0.062 mol) of solid sodium hexafluoroantimonate are added to the cloudy solution and the mixture is stirred at RT for 1 h. After addition of 1 spatula-full of active charcoal, the mixture is filtered and 750 ml of water are added to the clear filtrate. The crystals which have precipitated are filtered off, dried, washed with 100 ml of ether and dried again. 16.41 g (74% of theory) of tribenzylsulfonium hexafluoroantimonate are obtained as colourless crystals of melting point 170° C. (decomposition).

Elemental analysis for C$_{21}$H$_{21}$SSbF$_6$: Calculated: (%) C=46.61, H=3.91, S=5.92. Found: (%) C=47.44, H=3.99, S=6.09.

$^1$H-NMR (100 MHz, d$_6$-DMSO) in ppm: 4.78 (singlet, 6H); 7.32 (singletoid, 15H).

3. Dibenzylphenylsulfonium hexafluoroantimonate a) A solution of 75.0 g (0.374 mol) of benzylphenyl sulfide, 60.73 g (0.561 mol) of benzyl alcohol in 350 ml of methylene chloride is introduced into a reaction vessel provided with a stirrer and thermometer. 182.45 g (1.12 mol) of 54% by weight HBF$_4$ in diethyl ether are added dropwise at an internal temperature of 20°–30° C. in the course of 35 min, while stirring. The reaction mixture is then stirred at RT for 2 h. The reaction mixture is diluted with 300–400 ml of methylene chloride and extracted 4 times with water (pH ~6). The organic phase is then dried over MgSO$_4$ and the solvent is removed on a rotary evaporator. The yellow-brown oil which remains is stirred in 400 ml of toluene and the mixture is left to crystallize at 0°–5° C. for about 1 h. The suspension is filtered and the residue is washed with a little cooled toluene (0°–5° C.). The pure product is dried under a high vacuum at RT overnight. 123.8 g (87% of theory) of dibenzylphenylsulfonium tetrafluoroborate are obtained as white crystals of melting point 110°–115° C.

$^1$H-NMR (in d$_6$-acetone, 100 MHz) in ppm: 5.30 (quartet, 4H); 7.22–8.02 (multiplet, 15H).

b) A mixture of 123.0 g (0.325 mol) of dibenzylsulfonium tetrafluoroborate in 400 ml of methylene chloride is dissolved in a 2 liter round-bottomed flask at RT under N$_2$ to give a clear solution. 117.8 g of sodium hexafluoroantimonate are then added and the mixture is stirred at RT for 3½ h. The suspension is now filtered over silica gel and the solvent is removed from the filtrate using a rotary evaporator. The slightly reddish viscous residue is dissolved again in 250 ml of methanol, and after addition of 250 ml of water the product is allowed to crystallize at RT for 1–2 h. The suspension is filtered and the residue is washed with water. The product is then dried under a high vacuum at RT overnight. 163.9 g (95% of theory) of dibenzylphenylsulfonium hexafluoroantimonate are obtained as white crystals of melting point 105°–109° C.

Elemental analysis Calculated: (%) C=45.6 H=3.63 S=6.08 Sb=23.09 F=21.62 Found: (%) C=46.5 H=3.7 S=6.1 Sb=22.4 F=20.6.

$^1$H-NMR (d$_6$-acetone in MHz) in ppm: 5.37 (quartet, 4H); 7.25–8.04 (multiplet, 15 H).

4. Di-(4-chlorobenzyl)-benzylsulfonium hexafluoroantimonate a) 5.66 g (20 mmol) of di-(4-chlorobenzyl) sulfide are reacted with 2.6 g (24 mmol) of benzyl alcohol and 8.13 g (50 mmol) of 54% by weight HBF$_4$ in 20 ml of methylene chloride as described in Example 3a). 7.44 g (80% of theory) of di-(4-chlorobenzyl)-benzylsulfonium tetrafluoroborate are obtained as white crystals of melting point 123°–125° C.

$^1$H-NMR (100 MHz, CDCl$_3$) in ppm: 4.71 (singlet, 6H); 7.27 (doublet, 12H).

b) A mixture of 7.0 g (15.2 mmol) of di-(4-chlorobenzyl)-phenylsulfonium tetrafluoroborate and 25 ml of methylene chloride is dissolved under N$_2$ in a 100 ml round-bottomed flask to give a clear solution and the solution is cooled to 0°–5° C. 5.9 g (22.8 mmol) of sodium hexafluoroantimonate are added at this temperature and the mixture is stirred for about 3 h. The reaction mixture is filtered and the filtrate is freed from the solvent on a rotary evaporator. 50 ml of deionized water are now added to the residue and the product is crystallized out. It is left to crystallize at 0°–5° C. for 1–2 h. The crystals now obtained by filtration are washed with water and dried under a high vacuum at RT overnight. 8.26 g of di-(4-chlorobenzyl)-benzylsulfonium hexafluoroantimonate are obtained as white crystals of melting point 75°–77° C.

Elemental analysis Calculated: (%) C=41.34, H=3.14, S=5.26, Cl=11.62. Found: (%) C=41.24, H=3.15, S=5.08, Cl=12.37.

$^1$H-NMR (100 MHz) in ppm: 5.0 (multiplet, 6H); 7.44 (multiplet, 13H).

5. Dibenzylcyclohexylsulfonium hexafluoroantimonate a) 53.6 g (0.25 mol) of dibenzyl sulfide and 23.33 g (0.28 mol) of cyclohexene are dissolved in 100 ml of methylene chloride under an $N_2$ atmosphere in a reaction vessel (350 ml) provided with a stirrer and thermometer. 48.8 g of an approximately 54% by weight $HBF_4$ solution in diethyl ether are added dropwise at an internal temperature of 20°-30° C. in the course of one hour, while stirring. The orange-coloured reaction mixture is stirred at RT for 1 h, topped up with 10 ml of cyclohexene, stirred for a further 2 h, topped up again with 10 ml of cyclohexene and 1 ml of $HBF_4$ solution and stirred at RT for a further 2 h.

The reaction solution is diluted with 100 ml of methylene chloride and extracted 3 times by shaking with deionized water (pH 5-6). The organic phase is dried over magnesium sulfate and filtered and the solvent is removed on a rotary evaporator. 200 ml of cyclohexane are added to the residue (90.3 g/94% crude yield) and the mixture is stirred at RT. A colourless precipitate forms which, after being filtered off and dried in vacuo at RT, gives colourless crystals of melting point 95°-100° C. 61.45 g (64% yield) of dibenzylcyclohexylsulfonium tetrafluoroborate are obtained.

$^1$H-NMR (100 MHz, $d_6$-acetone) in ppm: 1.1-2.3 (multiplet + $d_6$-acetone); 3.3-4.2 (multiplet, 1H); 4.7-5.2 (multiplet, 4H); 7.2-7.8 (multiplet, 10H).

b) 61.2 g (0.16 mol) of dibenzylcyclohexylsulfonium tetrafluoroborate are dissolved in 250 ml of methylene chloride under $N_2$ as an inert gas, and 61.9 g (0.24 mol) of sodium hexafluoroantimonate are added. The mixture is stirred at RT for 2.5 h and the sodium tetrafluoroborate formed is then filtered off. The filtrate is extracted twice by shaking with deionized water and the extract is dried over magnesium sulfate and evaporated on a rotary evaporator. The solid residue (89.19 g/104% crude yield) is recrystallized from 500 ml of hot methanol to give, after drying in vacuo at RT, colourless crystals of melting point 111°-115° C. 53.9 g (63% yield) of dibenzylcyclohexylsulfonium hexafluoroantimonate are obtained.

Elemental analysis for $C_{20}H_{25}SSbF_6$: Calculated (%) C=45.05, H=4.73, S=6.01. Found (%) C=45.13, H=4.51, S=6.27.

$^1$H-NMR (100 MHz, d-chloroform) in ppm: 1.2-2.4 (multiplet, 10H); 3.56 (multiplet, 1H); 4.28-4.67 (quartet, 4H); 7.35 (singlet, 10H).

EXAMPLE 1

A resin mixture consisting of 200 g of bisphenol F diglycidyl ether having an epoxide content of 6.1 equivalents/kg and a viscosity of 1200 mPa.s at 25° C., 90 g of diisocyanatodiphenylmethane, prepolymerized and having an isocyanate content of 6.05 equivalents/kg and a viscosity of 120 mPa.s at 25° C. (obtainable under the commercial name ISONATE ® M 340 from DOW) and 90 g of diisocyanatodiphenylmethane having an isocyanate content of 7.92 equivalents/kg and a viscosity of 12 mPa.s at 25° C. (obtainable under the commercial name BAYMIDUR ® KU 3-5002 from BAYER) is mixed at room temperature with 686 g of quartz flour W 12 (commercial product from Quarzwerke Frechen), which has been preheated to 120° C., and the mixture is degassed overnight at about 80° C. under a vacuum of 1.3-2.6 mbar, while stirring. 4 g of tris-(p-methylbenzyl)-sulfonium hexafluoroantimonate are stirred into this preliminary mixture and the mixture is further stirred in vacuo again for 30 minutes. The resulting homogeneous hot casting resin mixture at about 80° C. is poured into metal moulds preheated to 80° C. and cured in a circulating air oven at 150° C. in the course of 4 hours to the extent that the test specimens can easily be removed from the mould. After-curing of the test specimens is carried out at 200° C. for 16 hours. The resulting test specimens have the following properties:

| | |
|---|---|
| Gelling time at 140° C. (minutes, seconds) = | 4'50" |
| Flexural strength according to ISO 178 (N/mm$^2$) = | 117.8 |
| Edge fibre elongation according to ISO 178 (%) = | 1.08 |
| Flexural impact strength according to ISO R 179 = (J/m$^2$) | 7.4 |
| Heat distortion point according to ISO 75 (°C.) = | >250 |
| Torsion modulus drop according to ISO R 537, = stated as the point of inflexion in °C. | 218 |

EXAMPLES 2 AND 3

Example 1 is repeated, and instead of tris-(p-methylbenzyl)-sulfonium hexafluoroantimonate, 6 g of tribenzylsulfonium hexafluoroantimonate (Example 2) or 2.5 g of dibenzylphenylsulfonium hexafluoroantimonate (Example 3) are now employed as the curing agent. After curing of the mixtures in accordance with Example 1, test specimens having the following properties are obtained.

| | Example 2 | Example 3 |
|---|---|---|
| Gelling time at 140° C. (minutes seconds) | 5'51" | 4'50" |
| Flexural strength according to ISO 178 (N/mm$^2$) | 128.5 | 129.3 |
| Edge fibre elongation according to ISO 178 (%) | 1.13 | 1.14 |
| Flexural impact strength according to ISO R 179 (J/m$^2$) | 6.4 | 8.0 |
| Combustibility according to UL 94 after storage of the test specimens for 2 days at 23° C. and 7 days at 70° C. | HB*) HB | HB HB |
| Heat distortion point according to ISO 75 (°C.) | >250 | >250 |

*)Class HB = horizontal burning

EXAMPLES 4 AND 5

Example 1 is repeated and instead of tris-(p-methylbenzyl)-sulfonium hexafluoroantimonate, 3.8 g of di-(4-chlorobenzyl)-benzylsulfonium hexafluoroantimonate (Example 4) or 3.8 g of dibenzylcyclohexylsulfonium hexafluoroantimonate (Example 5) are now employed as the curing agent. After curing of the mixtures in accordance with Example 1, test specimens have the following properties are obtained.

| | Example 4 | Example 5 |
|---|---|---|
| Gelling time at 140° C. (minutes,) | 18' | 32' |
| Flexural strength according to ISO 178 (N/mm$^2$) | 123.8 | 117.8 |
| Edge fibre elongation according to ISO 178 (%) | 1.20 | 1.07 |
| Combustibility according to UL 94 after storage of the specimens for 2 days at 23° C. and 7 days at 70° C. | HB*) HB | HB HB |
| Heat distortion point according to ISO 75 (°C.) | 238 | 239 |

*)Class HB = horizontal burning

What is claimed is:

1. A thermosetting mixture which comprises
(a) an epoxy resin having on average more than one 1,2-epoxide group in the molecule,
(b) a di- or polyisocyanate compound, and
(c) a sulfonium salt selected from the group consisting of the compounds of formulae I to IV

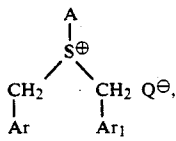 (I)

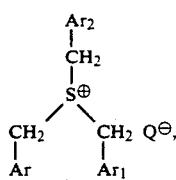 (II)

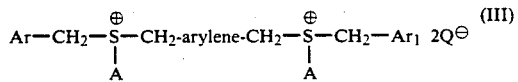 (III)

and

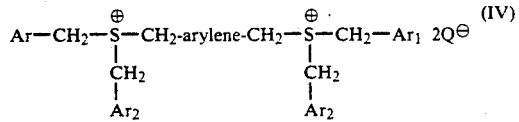 (IV)

wherein

A is $C_1$–$C_{12}$alkyl, $C_3$–$C_8$cycloalkyl, $C_4$–$C_{10}$cycloalkylalkyl or phenyl which is unsubstituted or substituted by one or more substituents selected from the group consisting of $C_1$–$C_8$alkyl, $C_1$–$C_4$alkoxy, halogen, nitro, phenyl, phenoxy, alkoxycarbonyl having 1–4 C atoms in the alkoxy radical and acyl having 1–12 C atoms;

Ar, $Ar_1$ and $Ar_2$ independently of one another are each phenyl which is unsubstituted or substituted by one or more substituents selected from the group consisting of $C_1$–$C_8$alkyl, $C_1$–$C_4$alkoxy, halogen, nitro, phenyl, phenoxy, alkoxycarbonyl having 1–4 C atoms in the alkoxy radical and acyl having 1–12 C atoms; or are naphthyl which is unsubstituted or substituted by one or more substituents selected from the group consisting of $C_1$–$C_8$alkyl, $C_1$–$C_4$alkoxy, halogen, nitro, phenyl, phenoxy, alkoxycarbonyl having 1–4 C atoms in the alkoxy radical and acyl having 1–12 C atoms;

arylene in each case is phenylene which is unsubstituted or substituted by one or more substituents selected from the group consisting of $C_1$–$C_8$alkyl, $C_1$–$C_4$alkoxy, halogen, nitro, phenyl, phenoxy, alkoxycarbonyl having 1–4 C atoms in the alkoxy radical and acyl having 1–12 C atoms; or is naphthylene which is unsubstituted or substituted by one or more substituents selected from the group consisting of $C_1$–$C_8$alkyl, $C_1$–$C_4$alkoxy, halogen, nitro, phenyl, phenoxy, alkoxycarbonyl having 1–4 C atoms in the alkoxy radical and acyl having 1–12 C atoms; and $Q^\ominus$ is $SbF_6^\ominus$, $AsF_6^\ominus$ or $SbF_5OH^\ominus$.

2. A mixture according to claim 1, in which the epoxy resin (a) is an aliphatic, cycloaliphatic or aromatic di- or polyepoxide compound.

3. A mixture according to claim 1, in which the epoxy resin (a) is an aromatic epoxy resin.

4. A mixture according to claim 1, in which the di- or polyisocyanate compound (b) is an aliphatic, cycloaliphatic or aromatic isocyanate.

5. A mixture according to claim 1, in which the di- or polyisocyanate compound (b) is an isomer mixture of 4,4'- and 2,4'-diisocyanatodiphenylmethane, polyol-modified polyisocyanate or a mixture of liquid polyisocyanates with higher molecular weight polyisocyanates or carbodiimide-polyisocyanates.

6. A mixture according to claim 1, in which component (c) is a sulfonium salt of the formula I or II.

7. A mixture according to claim 1, in which component (c) is a sulfonium salt of the formula I or II in which A is $C_1$–$C_{12}$alkyl, Ar, $Ar_1$ and $Ar_2$ independently of one another are each phenyl which is unsubstituted or substituted by one or more substituents selected from the group consisting of $C_1$–$C_8$alkyl, $C_1$–$C_4$alkoxy, Cl and Br, and $Q^\ominus$ is $SbF_6^\ominus$ or $SbF_5OH^\ominus$.

8. A mixture according to claim 1, in which component (c) is a sulfonium salt of the formula II in which Ar, $Ar_1$ and $Ar_2$ independently of one another are each phenyl which is unsubstituted or substituted by $C_1$–$C_8$alkyl, $C_1$–$C_4$alkoxy, Cl or Br, and $Q^\ominus$ is $SbF_6^\ominus$ or $SbF_5OH^\ominus$.

9. A mixture according to claim 1, in which component (c) is tris-(p-methylbenzyl)-sulfonium hexafluoroantimonate, tribenzylsulfonium hexafluoroantimonate or dibenzylphenylsulfonium hexafluoroantimonate.

10. A mixture according to claim 1, in which component (c) is di-(4-chlorobenzyl)-benzylsulfonium hexafluoroantimonate or dibenzylcyclohexylsulfonium hexafluoroantimonate.

11. A product obtained by thermal curing of a mixture according to claim 1.

* * * * *